United States Patent
Shen et al.

(10) Patent No.: US 12,493,380 B2
(45) Date of Patent: Dec. 9, 2025

(54) SENSING SYSTEM AND METHOD TO DETECT MOISTURE ON A SENSING REGION OF AN INPUT DEVICE

(71) Applicant: Synaptics Incorporated, San Jose, CA (US)

(72) Inventors: Guozhong Shen, Fremont, CA (US); Guan-Hua Cao, San Jose, CA (US); Long-Ming Cheng, Guangdong Sheng (CN); Ching-Hsung Wang, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/619,337

(22) Filed: Mar. 28, 2024

(65) Prior Publication Data

US 2025/0306709 A1    Oct. 2, 2025

(51) Int. Cl.
*G06F 3/041* (2006.01)
*G06F 3/044* (2006.01)

(52) U.S. Cl.
CPC .......... *G06F 3/0418* (2013.01); *G06F 3/0445* (2019.05); *G06F 3/0446* (2019.05)

(58) Field of Classification Search
None
See application file for complete search history.

(56) References Cited

U.S. PATENT DOCUMENTS

| | | | | |
|---|---|---|---|---|
| 8,823,399 B1* | 9/2014 | Bharathan | ........... | G06F 3/04166 |
| | | | | 324/684 |
| 8,982,097 B1* | 3/2015 | Kuzo | ................. | G06F 3/04186 |
| | | | | 345/174 |
| 9,501,169 B2 | 11/2016 | Losh | | |
| 9,965,105 B2 | 5/2018 | Hoch et al. | | |
| 10,788,939 B2 | 9/2020 | Goudarzi et al. | | |
| 11,409,396 B1 | 8/2022 | Hoch | | |
| 11,868,555 B2 | 1/2024 | Hargreaves et al. | | |
| 2015/0049043 A1* | 2/2015 | Yousefpor | ........... | G06F 3/04186 |
| | | | | 345/174 |
| 2015/0338971 A1* | 11/2015 | Nam | ...................... | G09G 5/003 |
| | | | | 345/174 |
| 2016/0179283 A1* | 6/2016 | Hoch | .................... | G06F 3/0443 |
| | | | | 345/174 |

(Continued)

OTHER PUBLICATIONS

Shen, G., et al., "Sensing method to reliably detect moisture on touch sensor," Synaptics, Dec. 31, 2023.

*Primary Examiner* — Md Saiful A Siddiqui
(74) *Attorney, Agent, or Firm* — Leydig, Voit & Mayer, Ltd.

(57) ABSTRACT

A method for capacitive sensing is provided. The method comprises: obtaining, by a processing system and using a first set of electrodes from a plurality of electrodes of an input device, first resulting signals based on driving a second set of electrodes from the plurality of electrodes, wherein the first set of electrodes and the second set of electrodes are oriented on a same axis of orientation; obtaining, by the processing system, second resulting signals based on operating a third set of electrodes from the plurality of electrodes in an absolute capacitance sensing (ABS) scheme; and determining, by the processing system, a presence of moisture on a sensing region of the input device based on the first resulting signals and the second resulting signals.

19 Claims, 7 Drawing Sheets

(56) References Cited

U.S. PATENT DOCUMENTS

| | | | |
|---|---|---|---|
| 2019/0034028 A1* | 1/2019 | Stevenson | G06F 3/04186 |
| 2022/0027012 A1* | 1/2022 | Kim | G06F 3/0448 |
| 2022/0050548 A1* | 2/2022 | Goudarzi | G01V 3/088 |
| 2023/0042134 A1* | 2/2023 | Been | A61B 5/6898 |

* cited by examiner

| | | |
|---|---|---|
| 502 → | -11 | 0 | ← 536 |
| 504 → | 3 | 1 | ← 538 |
| 506 → | -8 | 2 | ← 540 |
| 508 → | -13 | 3 | ← 542 |
| 510 → | -69 | 4 | ← 544 |
| 512 → | -33 | 5 | ← 546 |
| 514 → | -13 | 6 | ← 548 |
| 516 → | 21 | 7 | ← 550 |
| 518 → | 125 | 8 | ← 552 |
| 520 → | 43 | 9 | ← 554 |
| 522 → | -4 | 10 | ← 556 |
| 524 → | -19 | 11 | ← 558 |
| 526 → | 20 | 12 | ← 560 |
| 528 → | -5 | 13 | ← 562 |
| 530 → | -5 | 14 | ← 564 |
| 532 → | 9 | 15 | ← 566 |
| 534 → | -14 | 16 | ← 568 |

FIG. 5
500

SENSING SYSTEM AND METHOD TO DETECT MOISTURE ON A SENSING REGION OF AN INPUT DEVICE

TECHNICAL FIELD

This disclosure relates generally to electronic devices, and more specifically, to capacitive sensors and capacitive sensing.

BACKGROUND

Input devices, including capacitive sensor devices (e.g., touchpads or touch sensor devices), are widely used in a variety of electronic systems. A capacitive sensor device may include a sensing region, often demarked by a surface (e.g., display screen), in which the capacitive sensor device determines the presence, location and/or motion of one or more input objects. Capacitive sensor devices may be used to provide interfaces for the electronic system. For example, capacitive sensor devices may be used as input devices for larger computing systems (e.g., opaque touchpads integrated in, or peripheral to, notebook or desktop computers). Capacitive sensor devices are also often used in smaller computing systems (e.g., touch screens integrated in cellular phones). Capacitive sensor devices may also be used to detect input objects (e.g., finger, styli, pens, fingerprints, etc.).

As used in touch sensing applications, capacitive sensor devices are able to detect position, movement, and/or features of an input object contacting a sensing surface. However, especially in more humid environments, the presence of moisture on the surface of the capacitive sensor devices may impact the functionality of the capacitive sensor devices from being able to detect user input. For example, in the presence of moisture (e.g., water droplets on the surface), the capacitive sensor devices may have difficulty determining whether the user is providing user input using the input object (e.g., the user's finger) or whether there is moisture on the surface. Therefore, conventional capacitive sensor devices may have difficulty operating in certain environments such as in humid environments or during precipitation.

SUMMARY

This summary is provided to introduce a selection of concepts in a simplified form that are further described below. This summary is not intended to necessarily identify key features or essential features of the present disclosure. The present disclosure may include the following various aspects and examples.

In an exemplary embodiment, the present disclosure provides a method for capacitive sensing. The method comprises: obtaining, by a processing system and using a first set of electrodes from a plurality of electrodes of an input device, first resulting signals based on driving a second set of electrodes from the plurality of electrodes, wherein the first set of electrodes and the second set of electrodes are oriented on a same axis of orientation; obtaining, by the processing system, second resulting signals based on operating a third set of electrodes from the plurality of electrodes in an absolute capacitance sensing (ABS) scheme; and determining, by the processing system, a presence of moisture on a sensing region of the input device based on the first resulting signals and the second resulting signals.

In another exemplary embodiment, the present disclosure provides an input device comprising: a plurality of electrodes; and a processing system configured to: obtain, using a first set of electrodes from the plurality of electrodes, resulting signals based on driving a second set of electrodes from the plurality of electrodes, wherein the first set of electrodes and the second set of electrodes are oriented on a same axis of orientation; determine a grounding condition of the input device, wherein the grounding condition indicates whether the input device is operating in a low ground mass (LGM) condition; and determine a presence of moisture on a sensing region of the input device based on the grounding condition and the resulting signals.

In yet another exemplary embodiment, the present disclosure provides a non-transitory computer-readable medium having processor-executable instructions stored thereon. The processor-executable instructions, when executed, facilitating performance of the following: obtaining, using a first set of electrodes from a plurality of electrodes of an input device, resulting signals based on driving a second set of electrodes from the plurality of electrodes, wherein the first set of electrodes and the second set of electrodes are oriented on a same axis of orientation; determining a grounding condition of the input device, wherein the grounding condition indicates whether the input device is operating in a low ground mass (LGM) condition; and determining a presence of moisture on a sensing region of the input device based on the grounding condition and the resulting signals.

Further features and aspects are described in additional detail below with reference to the FIGs.

BRIEF DESCRIPTION OF DRAWINGS

FIG. 5 shows a data structure indicating resulting signals obtained from a set of electrodes according to one or more examples of the present disclosure.

DETAILED DESCRIPTION

Figure 1:
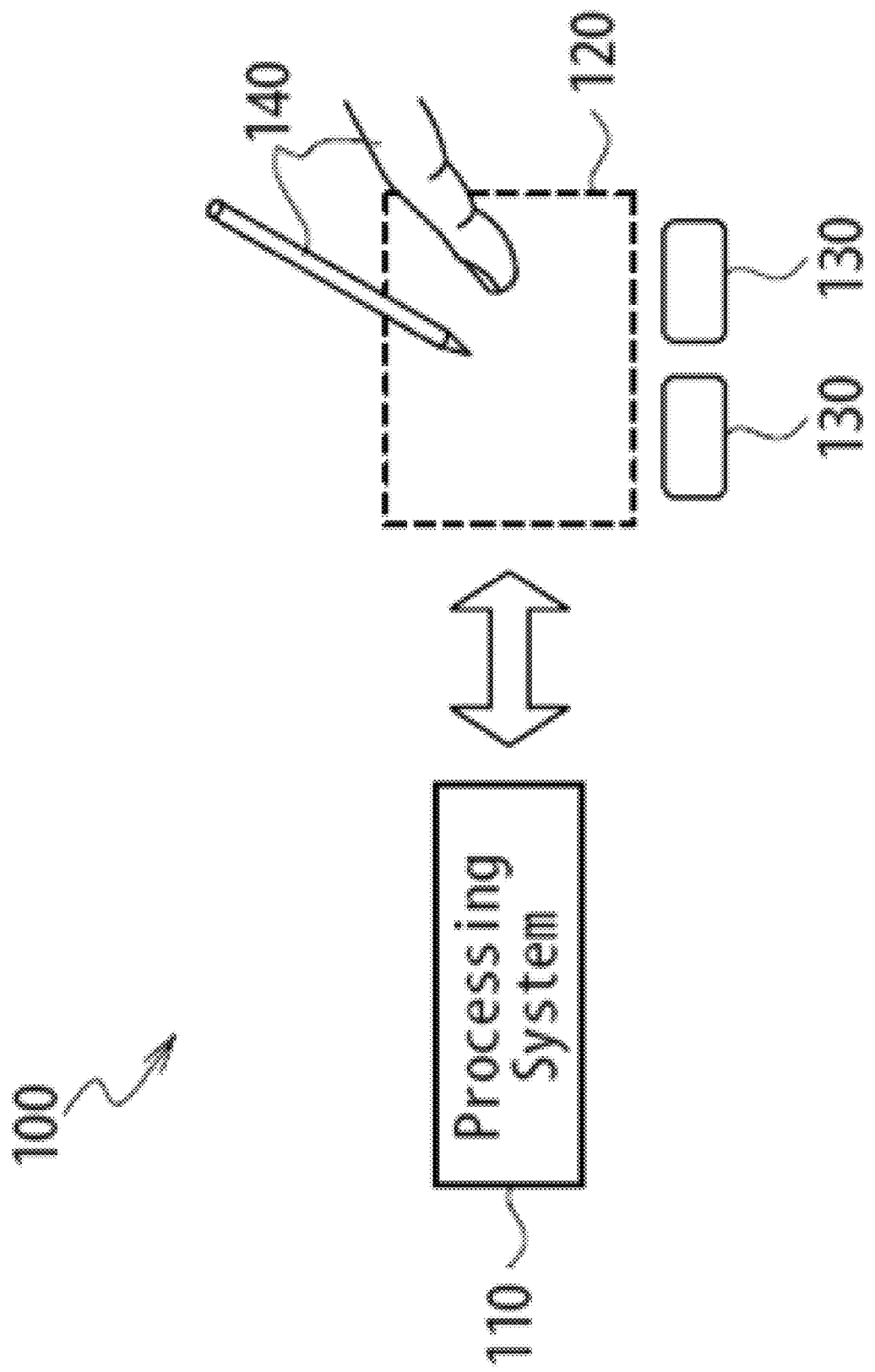
FIG. 1 depicts a schematic block diagram of an exemplary input device according to one or more examples of the present disclosure.

The drawings and the following detailed description are merely exemplary in nature, and are not intended to limit the disclosed technology or the application and uses of the disclosed technology. Furthermore, there is no intention to be bound by any expressed or implied theory presented in the preceding technical field, background, or the following detailed description.

In the following detailed description of various examples of the present disclosure, numerous details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The following description of sensor patterns relies on terminology such as "horizontal", "vertical", "top", "bottom", and "under" to clearly describe certain geometric features of the sensor patterns. The use of these terms is not intended to introduce a limiting directionality. For example, the geometric features may be rotated to any degree, without departing from the disclosure. Further, while patterns of certain sizes are shown in the drawings, the patterns may extend and/or repeat without departing from the disclosure. For example, the use of the term columns and vertical direction is to distinguish between rows and the horizontal direction, respectively. If the input device is rectangular, any direction along the surface may be designated as the vertical direction by which a column extends and any substantially orthogonal direction along the surface may be designated as a vertical direction along which the row extends.

Various examples of the present disclosure provide input devices and processes for detecting moisture on a surface of an input device (e.g., the touch sensors or the sensing region of the input device) using parallel transcapacitance sensing (PTS) schemes and/or absolute capacitance sensing (ABS) schemes. By using the processes described herein, this may improve touch performance with moisture on the surface of the input device. In some instances, the processes described herein may include generating a PTS profile using a PTS scheme, determining a grounding condition of the input device, and determining a presence of moisture on the surface of the input device based on the grounding condition and the PTS profile. For example, based on a grounding condition indicating a good grounding condition and based on comparing the PTS profile to one or more thresholds, the present disclosure may determine the presence of moisture on the surface of the input device. In other examples, based on the grounding condition indicating a low ground mass (LGM) condition, the present disclosure may then further generate an ABS profile using an ABS scheme. The present disclosure may compare the PTS profile with the ABS profile to determine the presence of moisture on the surface of the input device. This will be described in further detail below.

FIG. 1 depicts a schematic block diagram of an exemplary input device 100 according to one or more examples of the present disclosure. The example input device 100 may be configured to provide input to an electronic system. As used herein, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, and/or alternatively, the electronic system may be a host or a slave to the input device. The electronic system may also be referred to as electronic device.

The input device 100 may be implemented as a physical part of the electronic system, or may be physically separate from the electronic system. In some examples, the electronic system may be referred to as a host device. As appropriate, the input device 100 may communicate with parts of the electronic system using any one or more of the following: buses, networks, and other wired or wireless interconnections. Examples include I2C, SPI, PS/2, Universal Serial Bus (USB), BLUETOOTH, RF, and IRDA.

In FIG. 1, the input device 100 is shown as a capacitive sensor device configured to sense input provided by one or more input objects 140 in a sensing region 120. Example input objects 140 include fingers and styli, as shown in FIG. 1. An exemplary capacitive sensor device may be a touchpad, a touch screen, a touch sensor device and the like.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from example to example. In some examples, the sensing region 120 extends from a surface of the input device 100 in one or more directions into space until signal-to-noise ratios prevent sufficiently accurate object detection. The distance to which this sensing region 120 extends in a particular direction, in various examples, may be on the order of less than a millimeter, millimeters, centimeters, or more, and may vary significantly with the type of sensing technology used and the accuracy desired. Thus, some examples sense input that comprises: no contact with any surfaces of the input device 100; contact with an input surface, e.g., a touch surface, of the input device 100; contact with an input surface of the input device 100 coupled with some amount of applied force or pressure; and/or a combination thereof. In various examples, input surfaces may be provided by surfaces of casings within which the sensor electrodes reside, by face sheets applied over the sensor electrodes or any casings, etc. In some examples, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may utilize capacitive sensing, and may further utilize elastive, resistive, inductive, magnetic, acoustic, ultrasonic, and/or optical techniques.

Some implementations are configured to provide images (e.g., of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like. In some instances, water droplets or moisture may collect on the surface of the input device 100 (e.g., on the sensing region 120 of the input device 100). When applying the voltage or current, the water droplets or moisture may also cause changes in the electric field. For instance, the moisture (e.g., water droplets) may be floating conductive objects. When present on the surface of the sensing region 120, the moisture may act as a bridge of the electrical field line and may increase the transcapacitance sensing measurement between the transmitter and receiver electrodes. This causes an opposite effect to when an actual input object (e.g., a finger) is present. For example, a finger may block the electrical field line between the transmitter and receiver electrodes, and thus reduces the transcapacitance sensing measurement. As such, based on the resulting signals indicating the sensing measurements between the transmitter and receiver electrodes, the presence of moisture on the sensing region 120 may be detected.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object (e.g., between a system ground and freespace coupling to the user). In various examples, an input object near the sensor electrodes alters the electric field near the sensor electrodes, thus changing the measured capacitive coupling. In one implementation, an absolute capacitance sensing method operates by modulating sensor electrodes with respect to a reference voltage, e.g., system ground, and by detecting the capacitive coupling between the sensor electrodes and input objects. In some implementations, sensing elements may be formed of a substantially transparent metal mesh (e.g., a reflective or absorbing metallic film patterned to minimize visible transmission loss from the display subpixels). Further, the sensor electrodes may be disposed over a display of a display device. The sensing electrodes may be formed on a common substrate of a display device (e.g., on the encapsulation layer of a rigid or flexible organic light emitting diode (OLED) display). An additional dielectric layer with vias for a jumper layer may also be formed of a substantially transparent metal mesh material (e.g., between the user input and the cathode electrode). Alternately, the sensor may be patterned on a single layer of metal mesh over the display active area with cross-overs outside of the active area. The jumpers of the jumper layer may be coupled to the electrodes of a first group and cross over sensor electrodes of a second group. In one or more examples, the first and second groups may be orthogonal axes to each other. Further, in various examples, the absolute capacitance measurement may comprise a profile (e.g., ABS profile) of the input object couplings accumulated along one axis and projected onto the other. In various examples, a modulated input object (e.g., a powered active stylus) may be received by the orthogonal electrode axes without modulation of the corresponding electrodes (e.g., relative to a system ground). In such an example, both axes may be sensed simultaneously and combined to estimate stylus position.

Some capacitive implementations utilize "mutual capacitance" (also often referred to as "transcapacitance") sensing methods based on changes in the capacitive coupling between sensor electrodes. In various examples, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transmitter signals. Receiver sensor electrodes may be held substantially constant relative to the reference voltage or modulated relative to the transmitter sensor electrodes to facilitate receipt of resulting signals. A resulting signal may comprise effect(s) corresponding to one or more transmitter signals, and/or to one or more sources of environmental interference, e.g., other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) chips and/or other circuitry components. For example, a processing system 110 for a mutual capacitance sensor device may comprise transmitter circuitry configured to transmit signals with transmitter sensor electrodes, and/or receiver circuitry configured to receive signals with receiver sensor electrodes. In some examples, the processing system 110 also comprises electronically-readable instructions, such as firmware code, software code, and/or the like. In some examples, components composing the processing system 110 are located together, such as near sensing element(s) of the input device 100. In other examples, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another example, with associated firmware) separate from the central processing unit. As another example, the input device 100 may be physically integrated in a phone, and the processing system 110 may comprise circuits and firmware that are part of a main processor (e.g., a mobile device application processor or any other central processing unit) of the phone. In some examples, the processing system 110 is dedicated to implementing the input device 100. In other examples, the processing system 110 also performs other user input functions, such as operating display screens, measuring input forces, measuring tactile switch state, driving haptic actuators, etc.

The processing system 110 may be implemented as a set of modules that handle different functions of the processing system 110. Each module may comprise circuitry that is a part of the processing system 110, firmware, software, or a combination thereof. In various examples, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some examples, the processing system 110 responds to user input (or lack of user input) in the sensing region 120 directly by causing one or more actions. Example actions include changing operation modes, as well as GUI actions such as cursor movement, selection, menu navigation, and other functions. In some examples, the processing system 110 provides information about the input (or lack of input) to some part of the electronic system, e.g., to a central processing system of the electronic system that is separate from the processing system 110, if such a separate central processing system exists. In some examples, some part of the electronic system processes information received from the processing system 110 to act on user input, such as to facilitate a full range of actions, including mode changing actions and GUI actions.

For instance, in some examples, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g., for FIR digital or IIR switched capacitor filtering) at appropriate sensing times. The sensing times may be relative to the display output periods (e.g., display line update periods or blanking periods). As yet another example, the processing system 110 may subtract or otherwise account for a baseline, such that the information reflects a difference between the electrical signals from user input and the baseline signals. A baseline may account for display update signals (e.g., subpixel data signal, gate select and deselect signal, or emission control signal) which are spatially filtered (e.g., demodulated and accumulated) and removed from the lower spatial frequency sensing baseline. Further, a baseline may compensate for a capacitive coupling between the sensor electrodes and one or more nearby electrodes. The nearby electrodes may be display electrodes, unused sensor electrodes, and or any proximate conductive object. Additionally, the baseline may be compensated for using digital or analog means. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some examples, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some examples, the input device 100 may be implemented with no other input components.

In some examples, the input device 100 comprises a touch screen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more examples, the input device 100 may comprise substantially transparent sensor electrodes (e.g., ITO, metal mesh, etc.) overlaying the display screen and provide a touch screen interface for the associated electronic system. The display panel may be any type of dynamic display capable of displaying a visual interface to a user, and may include any type of light emitting diode (LED), OLED, cathode ray tube (CRT), liquid crystal display (LCD), plasma, electroluminescence (EL), or other display technology. The input device 100 and the display panel may share physical elements. For instance, some examples may utilize some of the same electrical components for displaying and sensing. As another example, the display panel may be operated in part or in total by the processing system 110.

A cathode electrode of an OLED display may provide a low impedance screen between one or more display electrodes and the sensor electrodes which may be separated by a thin encapsulation layer. For example, the encapsulation layer may be about 10 um. Alternatively, the encapsulation layer may be less than 10 um or greater than 10 um. Further, the encapsulation layer may be comprised of a pin hole free stack of conformal organic and inorganic dielectric layers.

It should be understood that while many examples of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the examples of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
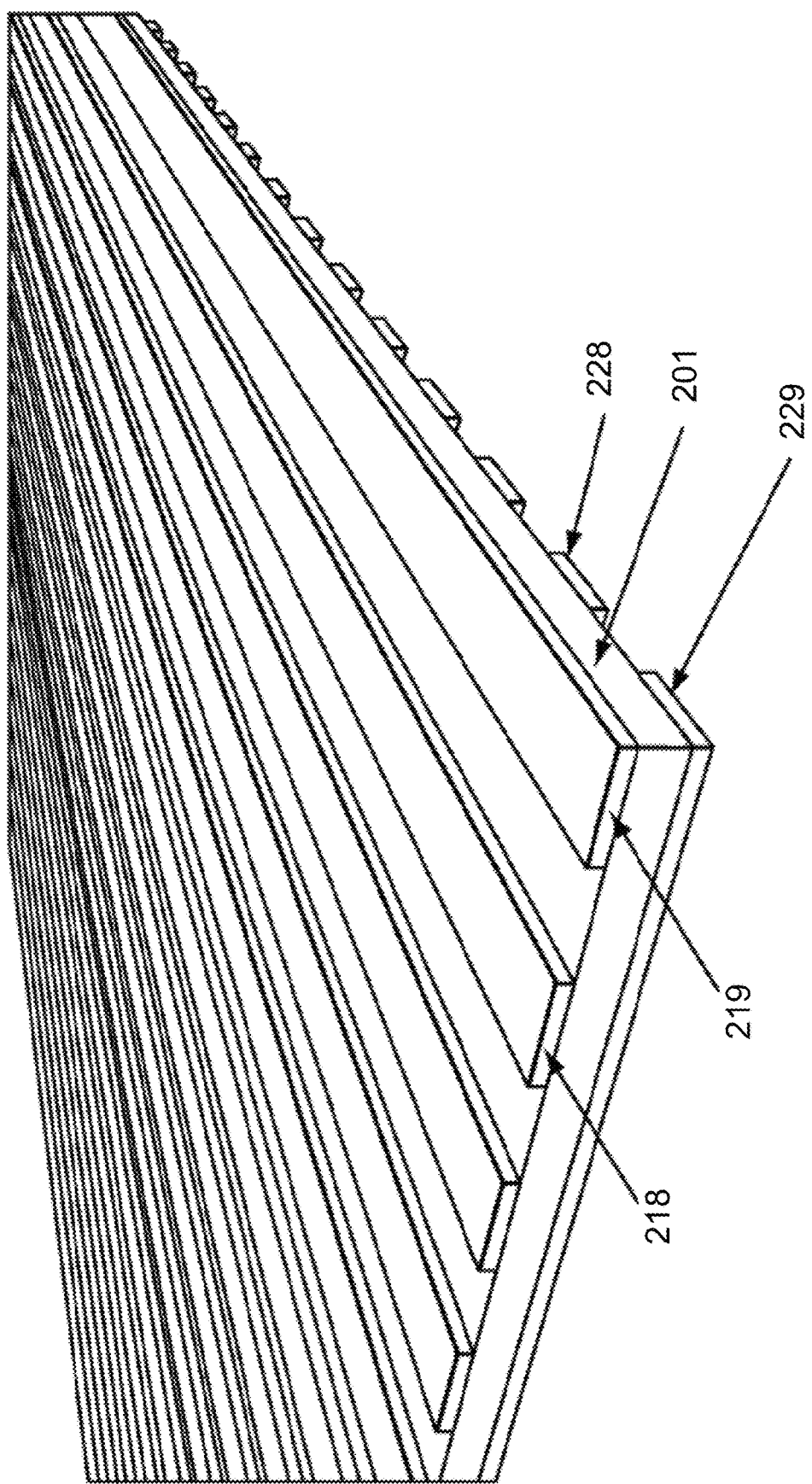
FIGS. 2A-2B depict an exemplary arrangement of electrodes that is usable with one or more examples of the present disclosure.
Figure 2B:
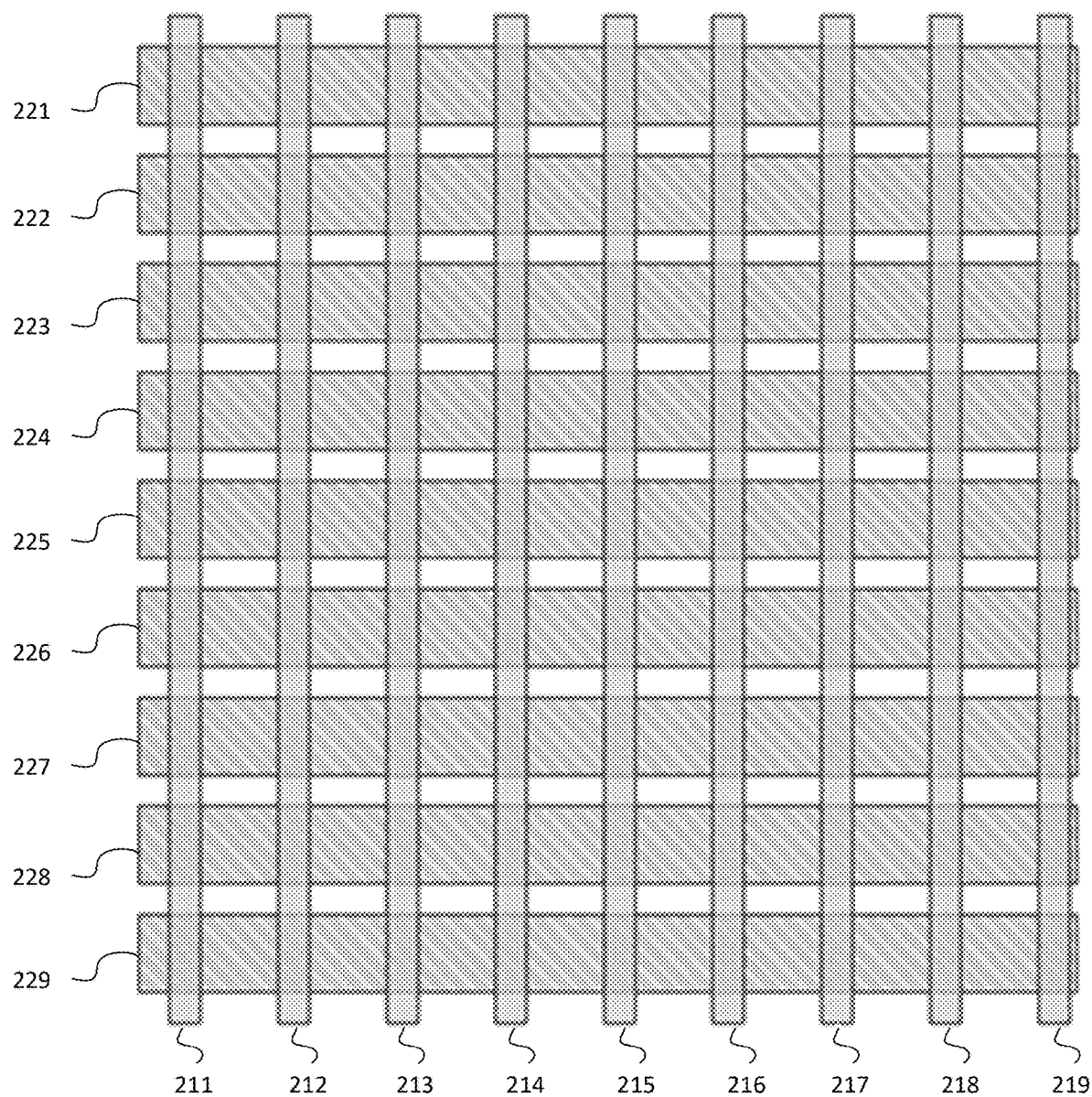

FIGS. 2A-2B depict an exemplary arrangement of electrodes that is usable with one or more examples of the present disclosure. It will be appreciated that the arrangement of rectangular electrodes shown in FIGS. 2A-2B is merely an illustrative example, and that many other types of electrode arrangements may be used in connection with the principles discussed herein.

The electrodes 211-219 and 221-229 from FIGS. 2A-2B may be driven based on multiple different driving and sensing schemes and/or methods. For example, in some variations, the electrodes 211-219 and 221-229 may be driven using a transcapacitance sensing and/or driving scheme. In this scheme, a first group of electrodes in a first orientation (e.g., horizontal electrodes 221-229 disposed below substrate 201) are utilized as transmitter electrodes on which a processing system (e.g., the processing system 110 of FIG. 1) provides drive signals (e.g., driving signals), and a second group of electrodes in a second orientation (e.g., vertical electrodes 211-219 disposed above substrate 201) are utilized as receiver electrodes through which resulting signals are obtained based on the drive signals, whereby the resulting signals are output to the processing system.

In other variations, the electrodes 211-219 and 221-229 may be driven using a parallel transcapacitance sensing (PTS) and/or driving scheme. In the PTS scheme (e.g., PTS method), the second group of electrodes, on their own, are operated in a transcapacitive manner (e.g., with some of the vertical non-intersecting electrodes 211-219 being operated as transmitter electrodes and others operated as receiver electrodes), and/or the first group of electrodes, on their own, are operated in a transcapacitive manner (e.g., with some of horizontal non-intersecting electrodes 221-229 being operated as transmitter electrodes and others operated as receiver electrodes). In one exemplary example, one of the groups of electrodes is first operated in a transcapacitive manner to obtain sensing information corresponding to one orientation, followed by the other group of electrodes being operated in a transcapacitive manner to obtain sensing information corresponding to another orientation. In an alternative example, only one of the groups of electrodes is operated in a transcapacitive manner to obtain sensing information corresponding to a respective orientation, which may be sufficient for certain applications.

As such, in the transcapacitance scheme and/or the PTS scheme, the processing system 110 utilizes transcapacitive sensing involving transmitter and receiver electrodes. In some examples, for the PTS scheme, the transcapacitive sensing may be used to determine capacitances between neighboring electrodes in the same layer (e.g., in the same plane) that are adjacent to one another (e.g., parallel to one another in the case of rectangular or diamond electrodes) without intersecting one another, non-intersecting electrodes which are second nearest neighbors, non-intersecting electrodes which are third nearest neighbors, etc.

In yet other variations, the electrodes 211-219 and 221-229 may be driven using another sensing and driving scheme such as an absolute capacitance sensing (ABS) scheme. As mentioned above, the ABS method operates by modulating sensor electrodes with respect to a reference voltage, e.g., system ground, and by detecting the capacitive coupling between the sensor electrodes and input objects. In other words, in the ABS method, the processing system 110 may drive an electrode (e.g., electrode 211) using a drive signal and obtain a resulting signal from the same electrode. The processing system 110 may perform the ABS method on one or more groups of electrodes (e.g., the first group of electrodes 221-229 and/or the second group of electrodes 211-219) and generate an ABS profile indicating the resulting signals from the group(s) of electrodes.

In some examples, for detecting moisture on the surface of the input device 100 (e.g., the sensing region 120 of the input device 100), the processing system 110 may utilize one or more of the sensing and driving schemes described above. For example, in some instances, the processing system 110 may initially utilize a PTS scheme for the electrodes 211-219 and/or 221-229, and generate a PTS profile. The PTS profile may indicate the resulting signals (e.g., the resulting signals indicating the magnitude and direction of the measurement values) from the electrodes (e.g., the electrodes 211-219 and/or 221-229). Further, the resulting signals may be different based on whether there is moisture (e.g., one or more water drops) or an input object 140 (e.g., finger) on the sensing region 120. For instance, as mentioned above, for the PTS scheme, the transmitter electrode (e.g., the electrode 211) may be driven using a drive signal and the receiver electrode (e.g., the electrode 212) may obtain a resulting signal that is based on driving the transmitter electrode. The resulting signal may indicate the electric field lines (e.g., magnitude and direction of the electric field) between the transmitter and receiver electrodes. For example, in the absence of an input object 140 and moisture, the resulting signal (e.g., a transcapacitance signal) may indicate a value close to zero (e.g., an interval of values that are above and below zero such as between −10 to 5). For instance, the resulting signal may be determined based on subtracting the actual measurement from the receiver electrode, such as electrode 212, with a baseline subtraction (e.g., a measurement or reading of the receiver electrode when an input object 140 is not present). In the presence of the input object 140, the input object 140 blocks the electrical field line between the transmitter and receiver electrodes, and thus reduces the resulting signal. For example, based on the input object 140 being present, the receiver electrode (e.g., the electrode 212) may obtain a measurement (e.g., a value such as an SNR value) that is substantially below zero such as a measurement from the receiver electrode of −60. In contrast, in the presence of moisture (e.g., a water droplet), the moisture acts as a bridge of the electrical line between the transmitter and receiver electrodes, and thus increases the resulting signal. For example, based on moisture being present, the processing system 110 may obtain a measurement from the receiver electrode that is above zero (e.g., a measurement of +9 for a small droplet of water and a measurement of +100 for a larger droplet of water). As such, after determining the PTS profile, the processing system 110 may compare the resulting signals from the PTS profile with one or more thresholds. Based on the comparison, the processing system 110 may determine the presence of an input object 140 and/or moisture on the sensing region 120. For example, based on a first threshold for moisture being +6 or above and one of the receiver electrodes (e.g., receiver electrode 211) indicating a resulting signal of +10 or +60, the processing system 110 may determine the presence of moisture at the location of the receiver electrode. Additionally, and/or alternatively, based on a second threshold for input object 140 detection being −30 or below and one of the receiver electrodes (e.g., receiver electrode 217) indicating a resulting signal of −60, the processing system 110 may determine the presence of the input object 140 at the location of the receiver electrode.

The measurement values, normalization of the resulting signals to be close to zero (e.g., based on using the baseline subtraction), thresholds, and directions described above are merely exemplary and the processing system 110 may use any measurement value, normalization, and threshold to determine the presence of moisture and/or the input object 140. For example, in some variations, the processing system 110 may include an offset of 100 to the measurement values and the thresholds. Thus, based on obtaining a resulting signal of 110 (e.g., the offset of 100 plus the measurement described above of +10) or greater, the processing system 110 may determine the presence of moisture on the sensing region 120. Based on obtaining a resulting signal of 50 or below (e.g., the offset 100 minus the measurement described above of −60), processing system 110 may determine the presence of an input object 140. Additionally, and/or alternatively, the direction of the magnitude may also be reversed for detecting the presence of moisture and the presence of the input object 140. For example, as mentioned above, the negative direction indicated the presence of the input object 140 (e.g., based on blocking the electrical field line and thus reducing the resulting signal) and the positive direction indicated the presence of moisture (e.g., based on the moisture acting as a bridge of the electrical line and thus increasing the resulting signal). In other examples, this may be reversed and in such examples, the positive direction may indicate the blocking of the electrical field line (e.g., the presence of the input object 140 may increase the measurement indicated by the resulting signal) and the negative direction may indicate the moisture acting as the bridge (e.g., the presence of moisture may decrease the measurement indicated the resulting signal). Other variations of the examples described above are hereby contemplated herein.

In some instances, the input device 100 may be operating in a good grounding condition. By operating in a good grounding condition, the processing system 110 may determine the presence of moisture based on the PTS profile. In other instances, the input device 100 may be operating in a low ground mass (LGM) condition. In the LGM condition, the behavior of resulting signal when detecting the input object 140 changes. For example, in the LGM condition, instead of the input object 140 blocking the electrical field line between the transmitter and receiver electrodes, the presence of the input object 140 actually performs a bridging effect. As such, whereas in a good grounding condition, the processing system 110 may obtain a resulting signal indicating a measurement that is below a threshold (e.g., a measurement of −60 as described above), in the LGM condition, the processing system 110 may obtain a resulting signal indicating a measurement that is above the threshold (e.g., a measurement of +60). Similarly, the processing system 110 may obtain a resulting signal for the presence of moisture that is reversed as well (e.g., in a good grounding condition, the resulting signal may indicate a measurement of +100 whereas in the LGM condition, the resulting signal may indicate a measurement of −100).

Therefore, in some examples, the processing system 110 may perform one or more algorithms to determine whether the input device 100 and/or the electronic system is in a good grounding condition or in a LGM condition. Based on determining the input device 100 is in a good grounding condition, the processing system 110 may determine the presence of moisture and/or the presence of the input object 140 based on the PTS profile. For example, based on the resulting signal being above a first threshold (e.g., greater than +6), the processing system 110 may determine the presence of moisture (e.g., a water droplet) on the sensing region 120. Based on the resulting signal being below a second threshold (e.g., less than −10), the processing system 110 may determine the presence of the input object 140 on the sensing region 120.

Based on determining the input device 100 is in a LGM condition, the processing system 110 may perform one or more additional driving and sensing schemes. For example, the processing system 110 may perform an ABS method to generate an ABS profile. In the ABS scheme/method, the processing system 110 may drive an electrode (e.g., the electrode 211) with a driving signal and obtain a resulting signal from the same electrode. Using the one or more groups of electrodes (e.g., the electrodes 211-219 and 221-229), the processing system 110 may generate an ABS profile. In some instances, using certain types of the ABS schemes such as when all of the electrodes are driven with the same waveform, the processing system 110 might not be able to detect floating objects such as moisture. For example, the floating object might not change the self-capacitance (e.g., the capacitance between the measuring electrode and the system ground), and thus the processing system 110 is unable to detect the floating object. In some examples, using other types of the ABS schemes such as grounding every other electrodes while performing absolute capacitance sensing on the non-grounded electrodes, the ABS scheme may be able to detect larger floating objects (e.g., moisture), but may fail to detect smaller floating objects. For example, in such examples, the PTS schemes may use a peak-to-peak voltage (Vpp) of 10 Volts (V) or greater and the ABS scheme may use a substantially smaller Vpp such as a Vpp of 2 V. Therefore, because the electrodes are being driven with a lower Vpp, the resulting signals obtained from the electrodes are also less in magnitude. Given the lower Vpp, these types of ABS schemes may have difficulty detecting the presence of water droplets, especially smaller water droplets. Therefore, in some variations, the processing system 110 may first use the PTS scheme, and may use the ABS scheme based on detecting the LGM condition.

As mentioned previously, in the PTS scheme, a first electrode (e.g., electrode 211) may be a transmitter electrode that is provided a driving signal and a second electrode (e.g., electrode 212) may be a receiver electrode that obtains a resulting signal. In the ABS scheme, one electrode (e.g., electrode 212) may be provided the driving signal and may further obtain the resulting signal. Therefore, in the ABS scheme and in the presence of an input object 140, the input object 140 distorts the electrical field whereas the moisture might not distort the electrical field or may distort the field insignificantly. The first electrode detects the distortion of the input object 140 and provides the resulting signal indicating the distortion to the processing system 110. The processing system 110 generates an ABS profile based on the resulting signals from the electrodes.

The processing system 110 may then compare the ABS profile with the PTS profile to determine the presence of moisture and/or the presence of the input object 140. For example, as mentioned above, the ABS profile may indicate the presence of the input object 140, but might not indicate the presence of the moisture whereas the PTS profile may indicate both the presence of the input object 140 and the presence of moisture. Based on comparing the ABS profile and the PTS profile, the processing system 110 may determine the presence of moisture and/or the presence of the input object 140. For instance, for each electrode, based on the PTS profile of the electrode indicating a detection (e.g., a detection of the input object 140 and/or moisture) and the ABS profile of the electrode also indicating a detection, the processing system 110 may determine that this detection is a detection of an input object 140. In contrast, based on the PTS profile of the electrode indicating a detection (e.g., a detection of the input object 140 and/or moisture) and the ABS profile of the electrode not indicating a detection, the processing system 110 may determine that this detection is a detection of moisture (e.g., a water droplet). The processing system 110 may then perform one or more actions based on the presence of moisture and/or the input object 140 on the sensing region 120. This will be described in more detail in FIGS. 4-6 below.

As mentioned above, the arrangement shown in FIGS. 2A-2B is merely an illustrative example, and many other electrode arrangements may be used in connection with the principles discussed herein. For example, any electrode pattern may be used in another exemplary example (such as diamonds, multiple-prongs of bars-and-stripes sensors, interleaved sensor patterns, matrix pad sensors, etc.). In other examples, the electrodes may be deposited on the same layer, and appropriate electrodes which need to be connected are electrically linked together by jumpers. In yet other examples, all the electrodes are deposited in the same layer, but with no jumpers, in which case the routing runs through the interior of the 2D area of the sensors, and as a result, all the electrodes are designed to run parallel to each other.

Additionally, it will be appreciated that the number of electrodes provided in each orientation as depicted in FIGS. 2A-2B is not a limitation, as in practice, many different array sizes may be used. For example, sensor arrays used in many user devices and/or input devices (e.g., smartphones) may have between 15-20 transmitters and 30-40 receivers. In devices with larger screens, there may be 25-35 transmitters and 60-70 receivers. The number of channels may be based on ASIC design, which limits the amount of available channels, and/or may be based on sensor design. For example, it takes a longer time to drive larger screens, which means that for a given framerate less measurements can be performed, which in turn leads to lower SNRs. Thus, the underlying RC time constant poses another practical limitation on the supported sensor size. In capacitive fingerprint sensors, the channel count may be around 256 on the longer axis.

Further, it will be appreciated that exemplary examples of the present disclosure are applicable to a wide variety of devices that employ capacitive sensing. For example, exemplary examples of the present disclosure may be implemented in on-cell touchscreen display devices, in-cell touchscreen display devices, touchpad devices, standalone fingerprint sensors, device-integrated fingerprint sensors, display-integrated fingerprint sensors, etc., and such exemplary examples may achieve various advantages, for example, with respect to touch sensing, proximity sensing (such as for face detection), moisture sensing, LGM correction, and in other situations.

Figure 3:
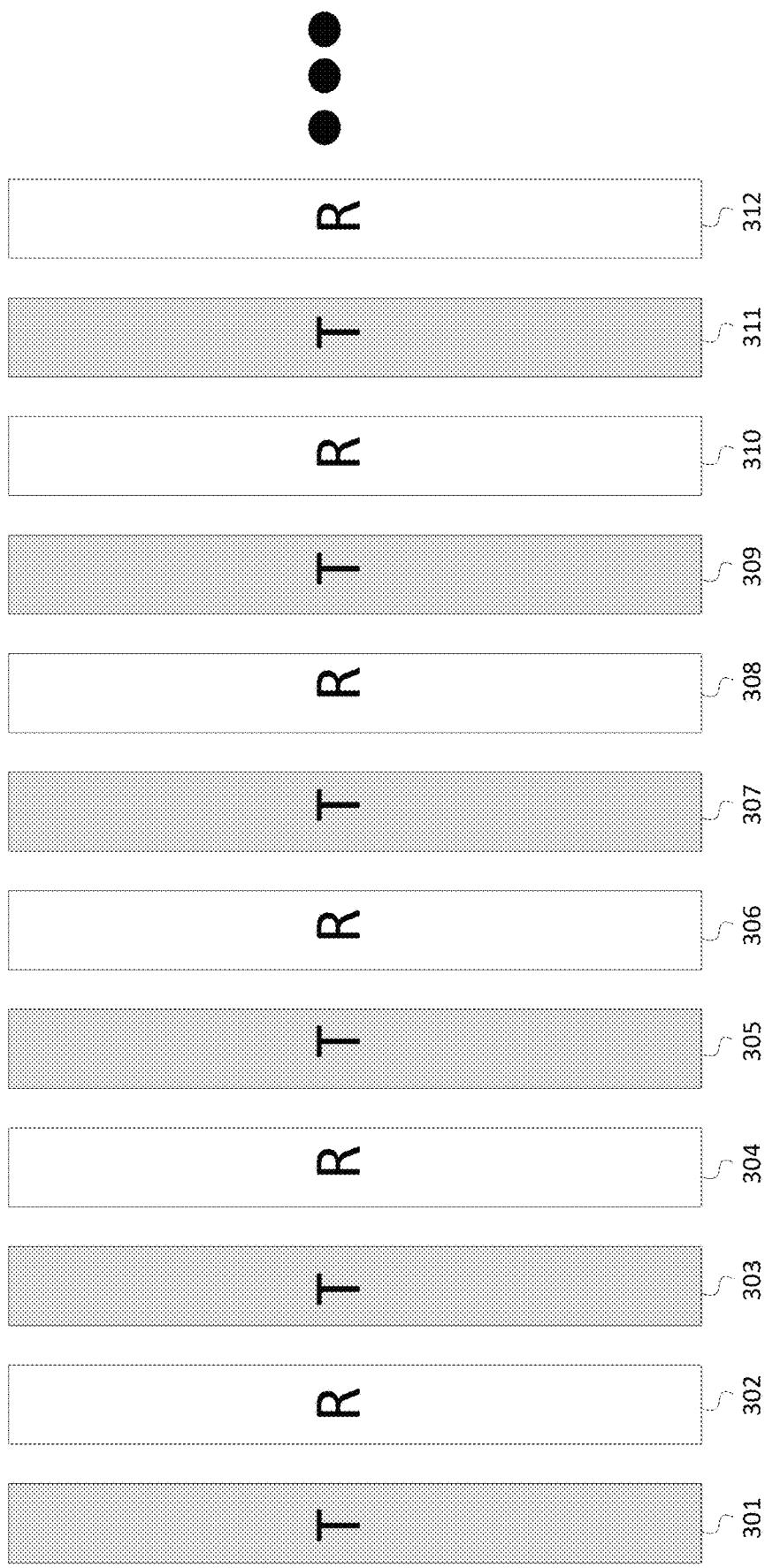
FIG. 3 depicts a parallel transcapacitance sensing (PTS) driving scheme for a set of electrodes according to one or more examples of the present disclosure.

FIG. 3 depicts a parallel transcapacitance sensing (PTS) driving scheme for a group of electrodes according to one or more examples of the present disclosure. The group of electrodes may be, for example, a group of vertical parallel rectangular electrodes 301, 302, 303, 304, 305, 306, 307, 308, 309, 310, 311, 312, . . . disposed above a group of horizontal parallel rectangular electrodes, such that the vertical parallel rectangular electrodes shown in FIG. 3 are part of an array of sensor electrodes similar to the type of configuration shown in FIGS. 2A-2B.

As shown in FIG. 3, every odd electrode is operated as a transmitter electrode (e.g., electrodes 301, 303, 305, 307, 309, 311), and every even electrode is operated as a receiver electrode (i.e., electrodes 302, 304, 306, 308, 310, 312). Example driving schemes, including PTS driving schemes, for driving the group of electrodes are described in U.S. Pat. No. 10,788,939, titled "CAPACITIVE SENSING ACQUISITION SCHEMES," and U.S. Pat. No. 11,409,396, titled "TRANSCAPACITIVE SENSING WITH CONSIDERATION OF CAPACITIVE COUPLINGS FROM NON-ADJACENT ELECTRODES," which are incorporated by reference in their entirety herein.

Figure 4:
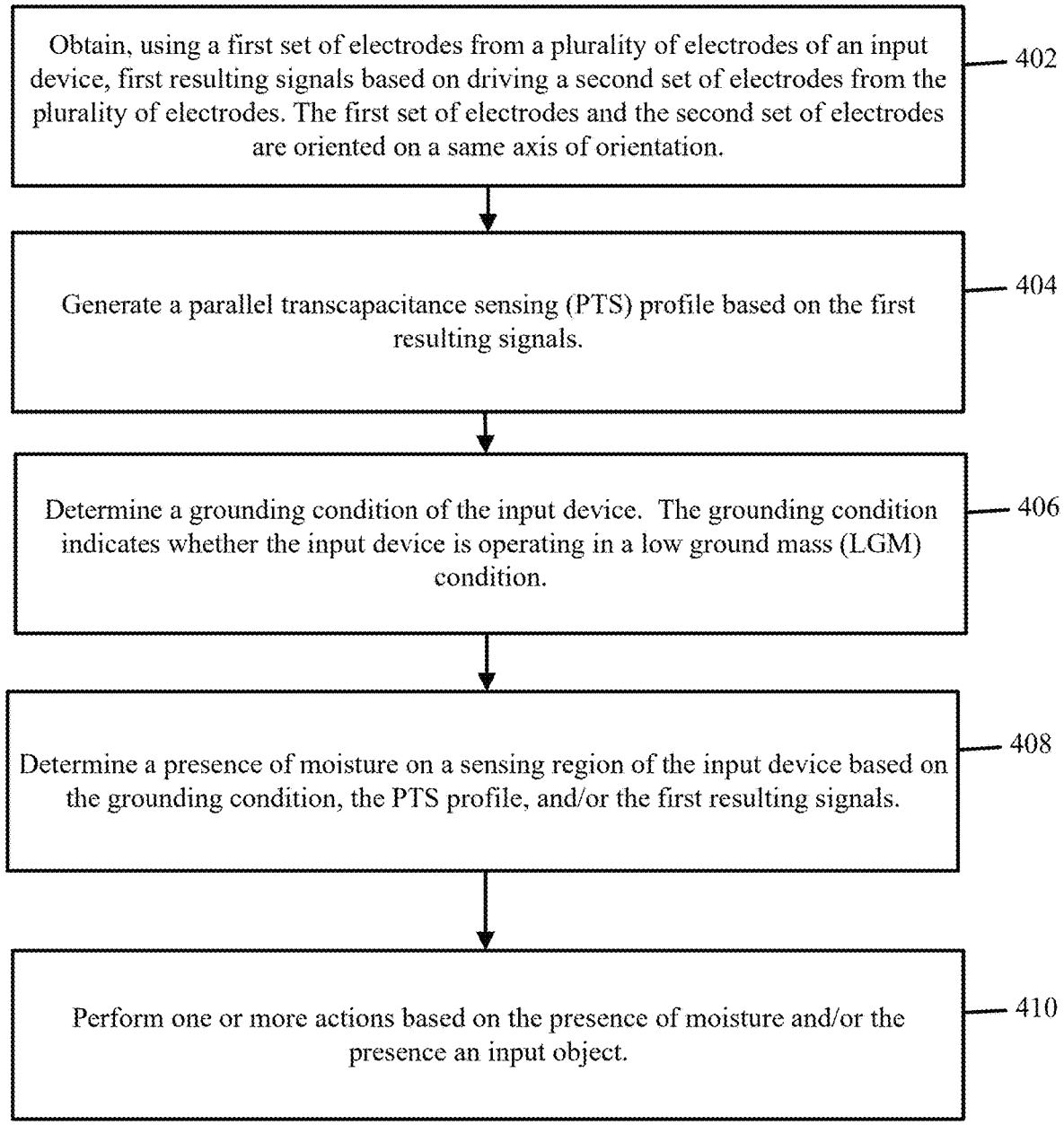
FIG. 4 depicts an exemplary flowchart for moisture detection on a surface of an input device according to one or more examples of the present disclosure.

FIG. 4 depicts an exemplary flowchart for moisture detection on a surface of an input device according to one or more examples of the present disclosure. The process 400 may be performed by the input device 100 and in particular, the processing system 110 shown in FIG. 1. However, it will be recognized that an input device that includes additional and/or fewer components as shown in FIG. 1 may be used to perform process 400, that any of the following blocks may be performed in any suitable order, and that the process 400 may be performed in any suitable environment. The descriptions, illustrations, and processes of FIG. 4 are merely exemplary and the process 400 may use other descriptions, illustrations, and processes for moisture detection on a surface (e.g., sensing region 120) of an input device 100.

In operation, at block 402, the processing system 110 obtains, using a first set of electrodes of an input device, first resulting signals based on driving a second set of electrodes from the plurality of electrodes. The first set of electrodes and the second set of electrodes are oriented on a same axis of orientation. For example, as mentioned above, the processing system 110 may perform one or more driving and sensing schemes and/or methods such as PTS scheme. In the PTS scheme, for a group of electrodes that are oriented on a particular axis (e.g., the horizontal electrodes or the vertical electrodes), the processing system 110 may set one or more of these electrodes as transmitter electrodes and one or more of these electrodes as receiver electrodes. For example, referring to FIGS. 2A and 2B, for a particular group of electrodes that are oriented on the same axis of orientation (e.g., the first group of electrodes such as the horizontal electrodes 211-229 or the second group of electrodes such as the vertical group of electrodes 211-219), the processing system 110 may determine that one or more electrodes from this group are transmitter electrodes and one or more electrodes are receiver electrodes. For example, as described above, the processing system 110 may alternate the assigning of these electrodes such that the odd number electrodes (e.g., electrodes 211, 213, 215, 217, and 219) are transmitter electrodes and the even number electrodes (e.g., electrodes 212, 214, 216, and 218) are receiver electrodes. Thus, in some examples, the second set of electrodes may be the odd number electrodes, the first set of electrodes may be the even number electrodes, and the plurality of electrodes may be all of the vertical electrodes 211-219. The processing system 110 may provide driving signals to the second set of electrodes (e.g., the transmitter electrodes 211, 213, 215, 217, and 219). Based on providing the driving signals, the processing system 110 obtains first resulting signals from the first set of electrodes (e.g., the receiver electrodes 212, 214, 216, and 218).

In some instances, the processing system 110 may provide driving signals to all of the transmitter electrodes in a same frame and obtain the resulting signals from all of the receiver electrodes in a subsequent frame. In other instances, the processing system 110 may provide the one or more driving signals in different frames and/or may obtain the resulting signals in different frames. For example, in a first frame, the processing system 110 may provide driving signals to one or more of the second set of electrodes (e.g., provide driving signals to the electrode 211 or the electrodes 211 and 213), and obtain resulting signals from one or more of the first set of electrodes (e.g., the electrode 212). In a subsequent frame, the processing system 110 may provide driving signals to another one or more of the second set of electrodes (e.g., provide driving signals to the electrode 215), and obtain resulting signals from one or more of the first set of electrodes (e.g., the electrode 214). The processing system 110 may continue providing driving signals to the transmitter electrodes in following frames and obtaining the resulting signals from the receiver electrodes. In such instances, the processing system 110 may use multiple frames to drive the second set of electrodes and obtain the resulting signals from the first set of electrodes.

At block 404, the processing system 110 generates a PTS profile based on the first resulting signals. The PTS profile may indicate the measurements obtained from the second set of electrodes (e.g., the receiver electrodes). FIG. 5 shows a data structure indicating resulting signals obtained from a set of electrodes according to one or more examples of the present disclosure. For instance, FIG. 5 shows a data structure 500 that is a PTS profile obtained from block 402. The top row of entries 502-534 of the PTS profile 500 are the measurements obtained from the receiver electrodes and the bottom row of entries 536-568 are identifiers associated with the receiver electrodes. For example, referring back to FIG. 2B, the receiver electrodes 212, 214, 216, and 218 may be associated with the identifiers 0 through 3 (e.g., entries 536-542) from the PTS profile 500. In addition, the input device 100 may include additional receiver electrodes that are not shown in FIG. 2B, which would be associated with the identifiers 4 through 16 (e.g., entries 544-568). As such, in the example shown in the PTS profile 500, the input device 100 includes 17 receiver electrodes and at block 402, the processing system 110 obtains 17 resulting signals from the 17 receiver electrodes.

The entries 502-534 may be the measurements of the resulting signals that were obtained from the receiver electrodes. For example, referring back to FIG. 2B, based on driving the transmitter electrodes 211, 213, 215, 217, and 219, the processing system 110 obtains resulting signals indicating measurements from the receiver electrodes 212, 214, 216, and 218. Further, the processing system 110 may drive additional transmitter electrodes of the input device 100 and obtain resulting signals from additional receiver electrodes that are identified in entries 544-568. The processing system 110 may populate the PTS profile 500 (e.g., the entries 502-534) based on the measurements indicated by the resulting signals. As such, the PTS profile 500 may indicate the measurements from the receiver electrodes (e.g., the first set of electrodes) as well as an identifier associated with the receiver electrodes (e.g., identifiers 0-16 associated with the first set of electrodes).

In some examples, the processing system 110 may generate the PTS profile that includes the resulting signals obtained from one or both axes of orientation. For instance, as mentioned above, in the PTS scheme and for some applications, only one of the groups of electrodes may be operated in a transcapacitive manner to obtain sensing information corresponding to a respective orientation. In other instances, one of the groups of electrodes is first operated in a transcapacitive manner to obtain sensing information corresponding to one orientation, followed by the other group of electrodes being operated in a transcapacitive manner to obtain sensing information corresponding to another orientation. As such, the processing system 110 may generate a PTS profile for only one group of electrodes (e.g., the vertical electrodes). Alternatively, the processing system 110 may generate a PTS profile for both groups of electrodes (e.g., the vertical and horizontal electrodes). In such examples, the processing system 110 may perform block 402 for the other group of electrodes to obtain additional resulting signals.

In some instances, block 404 is optional. When present, the processing system 110 generates the PTS profile such as the PTS profile 500 shown in FIG. 5, and uses the PTS profile to determine the presence of moisture on the surface of the input device (e.g., sensing region 120 of the input device 100). When absent, the processing system 110 may directly use the first resulting signals from block 402 to determine the presence of moisture.

At block 406, the processing system 110 determines a grounding condition of the input device 100. The grounding condition indicates whether the input device 100 is operating in a low ground mass (LGM) condition (e.g., whether the input device 100 is operating in the LGM condition or a good grounding condition). A LGM condition may be when the grounding condition of the input device 100 is low or otherwise non-optimal (e.g., when the input device 100 is lying on a desk rather than being held by a user). In such conditions, certain parasitic capacitance effects may result in signal artifacts and/or produce other deleterious results. For example, as mentioned above, under a good grounding condition (e.g., when the input device 100 is being held by the user and the grounding condition of the input device 100 is high), the input object 140 may block the electric field line between the transmitter and receiver electrode, which may reduce the measurement of the resulting signal obtained from the receiver electrode. For example, referring to FIG. 5, the PTS profile 500 may indicate a substantially negative value (e.g., a negative value of "−69" for the entry 510) when the input object 140 is present. As such, in good grounding conditions, based on the negative value being below a certain threshold, the processing system 110 may determine that an input object 140 is present near the receiver electrode with an identifier of "4". However, in a LGM condition, the input object 140 may actually bridge the electric field line between the transmitter and receiver electrode, which may increase the measurement of the resulting signal obtained from the receiver electrode. As such, in a LGM condition, the processing system 110 may obtain a positive value for the receiver electrode with an identifier of "4" even though there is a presence of an input object 140 near this receiver electrode. For the presence of moisture, the LGM condition may cause of reverse of the measurements as well, which is described above.

Therefore, in some variations, the usage of the first resulting signals that were obtained in block 402 might not be enough for the processing system 110 to determine the detection or presence of an input object 140 and/or moisture. Instead, the processing system 110 may use the first resulting signals (e.g., the PTS profile 500) and a determination whether the input device 100 is operating in a LGM condition or a good grounding condition (e.g., whether the input device 100 is on a desk versus in a user's hand) to determine the presence of input objects 140 and/or moisture.

The processing system 110 may use one or more processes, methods, and/or algorithms to determine the grounding condition of the input device 100 and whether the input device 100 is operating in a LGM condition or good grounding condition. Example processes, methods, and/or algorithms for determining the grounding condition, including the LGM condition and the good grounding condition, are described in U.S. Pat. No. 9,965,105, titled "SYSTEMS AND METHODS FOR DETECTING LOW GROUND MASS CONDITIONS IN SENSOR DEVICES," and U.S. Pat. No. 11,868,555, titled "LOW LATENCY INPUT OBJECT DETECTION UNDER LOW GROUND MASS CONDITION," which are incorporated by reference in their entirety herein.

In some examples, block 406 is optional. When present, the processing system 110 determines the grounding condition of the input device 100, and uses the grounding condition (e.g., whether the input device 100 is in a LGM condition or good grounding condition) to determine the presence of moisture on the sensing region. When absent, the processing system 110 might not perform block 406 and may move directly to block 408.

At block 408, the processing system 110 determines a presence of moisture on a sensing region 120 of the input device 100 based on the grounding condition, the PTS profile, and/or the first resulting signals. When performing block 404, the processing system 110 may determine the presence of moisture based on the PTS profile (e.g., PTS profile 500). In other instances (e.g., when not performing block 404), the processing system 110 may determine the presence of moisture based on the first resulting signals directly.

For example, based on block 406, the processing system 110 determines the grounding condition such as whether the input device 100 is operating in the LGM condition or the good grounding condition. Based on the input device 100 operating in the good grounding condition, the processing system 110 may use the first resulting signals and/or the PTS profile directly to determine the presence of moisture and/or the presence of an input object 140. Referring to FIG. 5, based on comparing the entries 502-534 of the PTS profile 500 with one or more thresholds, the processing system 110 may determine the presence of moisture and/or the presence of an input object 140. For example, based on the measurements exceeding a first threshold (e.g., above +5), the processing system 110 may determine the presence of moisture. As such, for the receiver electrodes with identifiers of "8", "12", and "15" (e.g., entries 552, 560, and 566), the processing system 110 may determine the measurement indicated by the resulting signals obtained from these receiver electrodes exceed the first threshold (e.g., the entries 518, 526, and 532 indicate measurement values of "125", "20", and "9"). Therefore, the processing system 110 may determine the presence of moisture (e.g., water droplets) near the receiver electrodes with identifiers of "8", "12", and "15" based on the measurement values exceeding the first threshold. In some instances, two or more thresholds may be used to determine the presence of moisture. For example, larger water droplets may have a greater magnitude of measurement values (e.g., "125") when compared to smaller water droplets (e.g., measurements of "20" and "9"). Using the two or more thresholds, the processing system 110 may determine the presence of moisture as well as the size of the water droplets. The processing system 110 may perform different actions at block 410 based on the size of the water droplets.

Additionally, and/or alternatively, in the good grounding condition, the processing system 110 may use one or more second thresholds to determine the presence of an input object 140. For example, based on comparing a second threshold (e.g., -30) with the entries 502-534 from the PTS profile 500, the processing system 110 may determine the presence of an input object 140. For instance, the entry 510 indicates a measurement of "-69", which is less than the second threshold. As such, based on the comparison, the processing system 110 may determine the presence of the input object 140 near the electrode with the identifier of "4".

In some variations, the processing system 110 may use the first resulting signals directly to determine the presence of moisture and/or the input object 140. For instance, the processing system 110 may compare the measurements indicated by the first resulting signals with one or more thresholds (e.g., the first and/or second thresholds described above) to determine the presence of moisture and/or the input object 140.

Figure 6:
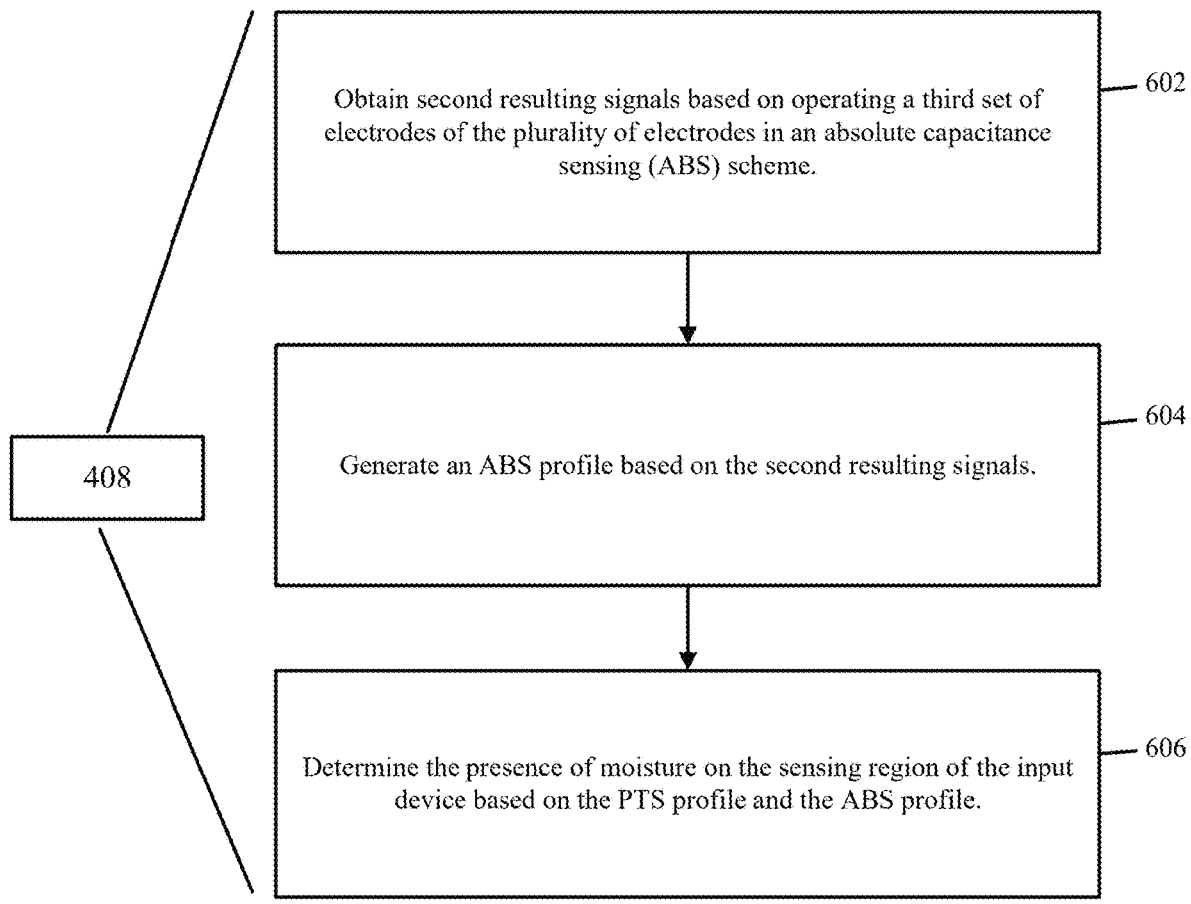
FIG. 6 depicts another exemplary flowchart for moisture detection on the surface of the input device according to one or more examples of the present disclosure.

Based on the input device 100 operating in the LGM condition, the processing system 110 might not be able to determine the presence of moisture and/or the presence of an input object 140 based on the first resulting signals and/or the PTS profile alone. In such instances, the processing system 110 may perform one or more additional driving and sensing schemes (e.g., ABS scheme) to determine the presence of moisture and/or the presence of an input object 140. FIG. 6 shows an exemplary process for determining the presence of moisture and/or the presence of an input object 140 based on the input device 100 operating in the LGM condition. For example, FIG. 6 depicts a flowchart for moisture detection on the surface of the input device according to one or more examples of the present disclosure. The process 600 may be performed by the input device 100 and in particular, the processing system 110 shown in FIG. 1. However, it will be recognized that an input device that includes additional and/or fewer components as shown in FIG. 1 may be used to perform process 600, that any of the following blocks may be performed in any suitable order, and that the process 600 may be performed in any suitable environment. The descriptions, illustrations, and processes of FIG. 6 are merely exemplary and the process 600 may use other descriptions, illustrations, and processes.

At block 602, the processing system 110 obtains second resulting signals based on operating a third set of electrodes from the plurality of electrodes in an absolute capacitance sensing (ABS) scheme. For example, referring to FIG. 2B, the third set of electrodes may be all of the vertical electrodes 211-219 or a subset of the vertical electrodes 211-219 (e.g., the receiver electrodes or the first set of electrodes). In other words, the third set of electrodes may include electrodes that are part of the first set of electrodes and/or the second set of electrodes that were used in block 402 to obtain the first resulting signals.

However, as described above, in the ABS scheme, the processing system 110 may provide driving signals to the third set of electrodes and obtain resulting signals from the same set of electrodes. For example, in block 402, in the PTS scheme, the processing system 110 provides the driving signals to the electrodes 211, 213, 215, 217, and 219, and obtains the first resulting signals from the electrodes 212, 214, 216, and 218. In block 602, in the ABS scheme, the processing system 110 may provide the driving signals to all of the electrodes 211-219 or a subset of the electrodes 211-219, and receive second resulting signals from all of the electrodes 211-219 or the subset of the electrodes 211-219.

In some examples, the processing system 110 may drive every electrode from the third set of electrodes in a first frame and obtain the second resulting signals in a following frame. In other examples, similar to block 402, the processing system 110 may use multiple frames to drive the electrodes from the third set of electrodes and/or multiple frames to obtain the second resulting signals.

At block 604, the processing system 110 generates an ABS profile based on the second resulting signals. For instance, similar to block 404, the processing system 110 generates an ABS profile including the measurements indicated by the second resulting signals and an identifier associated with the electrode that obtained the measurement. As mentioned above, using the ABS scheme, the electrodes may be able to detect the presence of an input object 140, but not of moisture on the sensing region 120. As such, the second resulting signals may indicate substantially the same measurement for the electrodes unless there is a presence of an input object 140.

In some examples, the processing system 110 may generate the ABS profile that includes the second resulting signals obtained from one or both axes of orientation. As such, the processing system 110 may generate the ABS profile for only one group of electrodes (e.g., the vertical electrodes). Alternatively, the processing system 110 may generate the ABS profile for both groups of electrodes (e.g., the vertical and horizontal electrodes). In such examples, the processing system 110 may perform block 602 for the other group of electrodes to obtain additional second resulting signals.

In some instances, block 604 is optional. When present, the processing system 110 generates the ABS profile, and uses the ABS profile to determine the presence of moisture on the surface of the input device (e.g., sensing region 120 of the input device 100). When absent, the processing system 110 may directly use the second resulting signals from block 602 to determine the presence of moisture.

At block 606, the processing system 110 determines the presence of moisture on the sensing region 120 of the input device 100 based on the PTS profile and the ABS profile. Additionally, and/or alternatively, when not performing blocks 404 and/or 604, the processing system 110 determines the presence of moisture on the sensing region 120 of the input device 100 based on the first resulting signals and the second resulting signals.

For instance, one electrode (e.g., a first electrode) may be part of the first set of electrodes that were used in the PTS scheme and may further be part of the third set of electrodes that were used in the ABS scheme. The processing system 110 may determine a first measurement of the electrode from the PTS profile and a second measurement of the electrode from the ABS profile. The processing system 110 may compare the first measurement with one or more first thresholds and may compare the second measurement with one or more second thresholds. Based on the first measurement exceeding the one or more first thresholds (e.g., greater than the one or more first thresholds) and the second measurement not exceeding the one or more second thresholds (e.g., not greater than the one or more second thresholds), the processing system 110 may determine the presence of moisture on the sensing region 120 of the input device 100 (e.g., at the location of the electrode). In contrast, based on the first measurement exceeding the one or more first thresholds and the second measurement exceeding the one or more second thresholds, the processing system 110 may determine the presence of an input object 140 on the sensing region 120 of the input device 100 (e.g., at the location of the electrode).

For example, as mentioned previously, the PTS profile and/or the first resulting signals may indicate the presence of moisture and/or the input object 140. The ABS profile and/or the second resulting signals may indicate the presence of the input object 140. As such, at block 606, the processing system 110 may compare the entries of the PTS profile with one or more first and/or second thresholds to determine the presence of moisture and/or the input object 140 (e.g., the measurements of the PTS profile 500 may exceed the first threshold or the second threshold, which may indicate the presence of moisture). The processing system 110 may further compare the entries of the ABS profile with one or more thresholds (e.g., third thresholds) to determine the presence of the input object 140. Based on the comparisons, the processing system 110 may determine the presence of moisture and/or the input object 140 on the sensing region 120 of the input device 100 when the input device 100 is operating in the LGM condition.

For example, based on a water droplet on the sensing region 120, using the PTS scheme, the processing system 110 may compare the first resulting signals with the one or more first/second thresholds to determine a detection (e.g., a detection of the input object 140 and/or moisture). Given that the input device 100 is operating in the LGM condition, the processing system 110 may be unable to determine whether this detection is the input object 140 or moisture (e.g., a water droplet). However, since the ABS scheme is unable to detect the moisture, the processing system 110 may compare the second resulting signals with one or more third thresholds to determine whether the input object 140 is present. The processing system 110 may then use the comparisons and align them with the receiver electrodes that obtained the first resulting signals and the second resulting signals. Based on the receiver electrode (e.g., the receiver electrode 212) indicating a detection for the first resulting signals and a detection for the second resulting signals (e.g., the measurements for the first resulting signals exceed the first and/or second thresholds and the measurements for the second resulting signals exceed the third threshold), the processing system 110 may determine that the receiver electrode detects a presence of an input object 140. However, based on the receiver electrode (e.g., the receiver electrode 214) indicating a detection for the first resulting signals, but not a detection for the second resulting signals (e.g., the measurements for the first resulting signals exceed the first and/or second thresholds, but the measurements for the second resulting signals do not exceed the third threshold), the processing system 110 may determine that the receiver electrode detects a presence of moisture.

In some examples, as mentioned above, block 406 is optional. When absent, based on the processing system 110 not performing block 406, the processing system 110 may move directly from block 402 and/or 404 to block 408. For example, after obtaining the first resulting signals and/or generating the PTS profile, the processing system 110 may perform process 600. For instance, the processing system 110 may perform one or more additional driving and sensing schemes (e.g., ABS scheme) to determine the presence of moisture and/or the presence of an input object 140 without performing block 406 and/or determining the grounding condition of the input device 100. As such, in some variations, the processing system 110 may perform the PTS scheme to obtain the first resulting signals and/or generate the PTS profile, and then proceed to performing the additional driving and sensing scheme (e.g., the ABS scheme) to obtain the second resulting signals and/or the ABS profile. In other words, in such variations, the processing system 100 may always perform two sensing schemes (e.g., the PTS scheme and the ABS scheme), and might not perform block 406 (e.g., determine whether the input device 100 is operating in a good grounding condition or a LGM condition).

Returning back to FIG. 4, at block 410, the processing system 110 performs one or more actions based on the presence of moisture and/or the presence of an input object 140. As mentioned above, based on the detection of the input object 140, the example actions include changing operation modes, as well as GUI actions such as cursor movement, selection, menu navigation, and other functions. However, based on distinguishing between the presence of moisture and the presence of the input object 140, at block 410, the processing system 110 may or might not perform the action based on whether an input object 120 is interacting with the sensing region 140 or whether there is moisture on the sensing region 120. Additionally, and/or alternatively, the processing system 110 may perform one or more actions such as reducing sensitivity when moisture is detected and/or limit the number of maximum fingers to be reported with the moisture.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary examples are described herein. Variations of those exemplary examples may become apparent to those of ordinary skill in the art upon reading the foregoing description. It is understood that skilled artisans are able to employ such variations as appropriate, and the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for capacitive sensing, comprising:
    obtaining, by a processing system and using a first set of electrodes from a plurality of electrodes of an input device, first resulting signals based on driving a second set of electrodes from the plurality of electrodes, wherein the first set of electrodes and the second set of electrodes are oriented on a same axis of orientation;
    determining, by the processing system, a grounding condition of the input device indicating whether the input device is operating in a low ground mass (LGM) condition; and
    in response to determining that the input device is operating in the LGM condition:
        obtaining, by the processing system, second resulting signals based on operating a third set of electrodes from the plurality of electrodes in an absolute capacitance sensing (ABS) scheme; and
        determining, by the processing system, a presence of moisture on a sensing region of the input device based on the first resulting signals and the second resulting signals.

2. The method of claim 1, wherein obtaining the first resulting signals is further based on driving the second set of electrodes using a parallel transcapacitance sensing (PTS) scheme, wherein the method further comprises:
    generating, by the processing system, a PTS profile based on the first resulting signals, and
        wherein determining the presence of moisture on the sensing region of the input device is based on the PTS profile and the second resulting signals.

3. The method of claim 1, wherein obtaining the first resulting signals comprises:
    driving one or more first electrodes from the second set of electrodes in a first frame;
    obtaining, from one or more second electrodes from the first set of electrodes, third resulting signals;
    driving one or more third electrodes from the second set of electrodes in a second frame; and
    obtaining, from one or more fourth electrodes from the first set of electrodes, fourth resulting signals, wherein the first resulting signals comprise the third resulting signals and the fourth resulting signals.

4. The method of claim 1, wherein the method further comprises:
    generating, by the processing system, an ABS profile based on the second resulting signals, and wherein determining the presence of moisture on the sensing region of the input device is based on the ABS profile and the first resulting signals.

5. The method of claim 1, wherein determining the presence of moisture on the sensing region of the input device based on the first resulting signals and the second resulting signals comprises:
    comparing the first resulting signals with one or more first thresholds;
    comparing the second resulting signals with one or more second thresholds; and
    determining the presence of moisture on the sensing region of the input device based on the comparisons.

6. The method of claim 5, wherein a first electrode is part of the first set of electrodes and the second set of electrodes, and wherein determining the presence of moisture on the sensing region of the input device based on the comparisons comprises:
    based on comparing the first resulting signals with the one or more first thresholds, determining a first measurement from the first electrode exceeds the one or more first thresholds;
    based on comparing the second resulting signals with the one or more second thresholds, determining a second measurement from the first electrode does not exceed the one or more second thresholds; and
    determining the presence of moisture on the sensing region of the input device based on determining the first measurement exceeds the one or more first thresholds and determining the second measurement does not exceed the one or more second thresholds.

7. The method of claim 5, wherein a first electrode is part of the first set of electrodes and the second set of electrodes, and wherein the method further comprises:
   based on comparing the first resulting signals with the one or more first thresholds, determining a first measurement from the first electrode exceeds the one or more first thresholds;
   based on comparing the second resulting signals with the one or more second thresholds, determining a second measurement from the first electrode exceeds the one or more second thresholds; and
   determining the presence of an input object based on determining the first measurement exceeds the one or more first thresholds and determining the second measurement exceeds the one or more second thresholds.

8. The method of claim 1, wherein determining the grounding condition comprises determining that the input device is not operating in the LGM condition, and wherein the method further comprises:
   in response to determining that the input device is not operating in the LGM condition:
      comparing the first resulting signals with one or more first thresholds; and
      determining the presence of moisture on the sensing region of the input device based on comparing the first resulting signals with the one or more first thresholds.

9. An input device, comprising:
   a plurality of electrodes; and
   a processing system configured to:
      obtain, using a first set of electrodes from the plurality of electrodes, first resulting signals based on driving a second set of electrodes from the plurality of electrodes, wherein the first set of electrodes and the second set of electrodes are oriented on a same axis of orientation;
      determine that the input device is operating in a low ground mass (LGM) condition; and
      in response to determining that the input device is operating in the LGM condition:
         obtain second resulting signals based on operating a third set of electrodes from the plurality of electrodes in an absolute capacitance sensing (ABS) scheme; and
         determine a presence of moisture on a sensing region of the input device based on the first resulting signals and the second resulting signals.

10. The input device of claim 9, wherein obtaining the first resulting signals is further based on driving the second set of electrodes using a parallel transcapacitance sensing (PTS) scheme, wherein the processing system is further configured to:
   generate a PTS profile based on the first resulting signals, and wherein determining the presence of moisture on the sensing region of the input device is based on the PTS profile and the second resulting signals.

11. The input device of claim 9, wherein obtaining the first resulting signals comprises:
   driving one or more first electrodes from the second set of electrodes in a first frame;
   obtaining, from one or more second electrodes from the first set of electrodes, third resulting signals;
   driving one or more third electrodes from the second set of electrodes in a second frame; and
   obtaining, from one or more fourth electrodes from the first set of electrodes, fourth resulting signals, wherein the first resulting signals comprise the third resulting signals and the fourth resulting signals.

12. The input device of claim 9, wherein the processing system is further configured to:
   determine that the input device is not operating in the LGM condition; and
   in response to determining that the input device is not operating in the LGM condition:
      compare the first resulting signals with one or more first thresholds; and
      determine the presence of moisture on the sensing region of the input device based on comparing the first resulting signals with the one or more first thresholds.

13. The input device of claim 12, wherein the processing system is further configured to:
   in response to determining that the input device is not operating in the LGM condition, compare the first resulting signals with one or more second thresholds, wherein the one or more first thresholds are different from the one or more second thresholds; and
   determine a presence of an input object on the sensing region of the input device based on comparing the first resulting signals with the one or more second thresholds.

14. The input device of claim 9, wherein the processing system is further configured to:
   generate an ABS profile based on the second resulting signals, and wherein determining the presence of moisture on the sensing region of the input device is based on the ABS profile and the first resulting signals.

15. The input device of claim 9, wherein determining the presence of moisture on the sensing region of the input device based on the first resulting signals and the second resulting signals comprises:
   comparing the first resulting signals with one or more first thresholds;
   comparing the second resulting signals with one or more second thresholds; and
   determining the presence of moisture on the sensing region of the input device based on the comparisons.

16. The input device of claim 15, wherein a first electrode is part of the first set of electrodes and the second set of electrodes, and wherein determining the presence of moisture on the sensing region of the input device based on the comparisons comprises:
   based on comparing the first resulting signals with the one or more first thresholds, determining a first measurement from the first electrode exceeds the one or more first thresholds;
   based on comparing the second resulting signals with the one or more second thresholds, determining a second measurement from the first electrode does not exceed the one or more second thresholds; and
   determining the presence of moisture on the sensing region of the input device based on determining the first measurement exceeds the one or more first thresholds and determining the second measurement does not exceed the one or more second thresholds.

17. The input device of claim 15, wherein a first electrode is part of the first set of electrodes and the second set of electrodes, and wherein the processing system is further configured to:

based on comparing the first resulting signals with the one or more first thresholds, determining a first measurement from the first electrode exceeds the one or more first thresholds;

based on comparing the second resulting signals with the one or more second thresholds, determining a second measurement from the first electrode exceeds the one or more second thresholds; and determining the presence of an input object based on determining the first measurement exceeds the one or more first thresholds and determining the second measurement exceeds the one or more second thresholds.

18. A non-transitory computer-readable medium having processor-executable instructions stored thereon for capacitive sensing, wherein the processor-executable instructions, when executed, facilitate:

obtaining, using a first set of electrodes from a plurality of electrodes of an input device, first resulting signals based on driving a second set of electrodes from the plurality of electrodes, wherein the first set of electrodes and the second set of electrodes are oriented on a same axis of orientation;

determining that the input device is operating in a low ground mass (LGM) condition; and in response to determining that the input device is operating in the LGM condition:

obtaining second resulting signals based on operating a third set of electrodes from the plurality of electrodes in an absolute capacitance sensing (ABS) scheme; and determining a presence of moisture on a sensing region of the input device based on the first resulting signals and the second resulting signals.

19. The non-transitory computer-readable medium of claim 18, wherein the processor-executable instructions, when executed, further facilitate:

determining that the input device is not operating in the LGM condition; and in response determining that the input device is not operating in the LGM condition:

comparing the first resulting signals with one or more first thresholds; and determining the presence of moisture on the sensing region of the input device based on comparing the first resulting signals with the one or more first thresholds.

* * * * *